J. T. WALLACE.
FEEDING MECHANISM.
APPLICATION FILED AUG. 5, 1911.

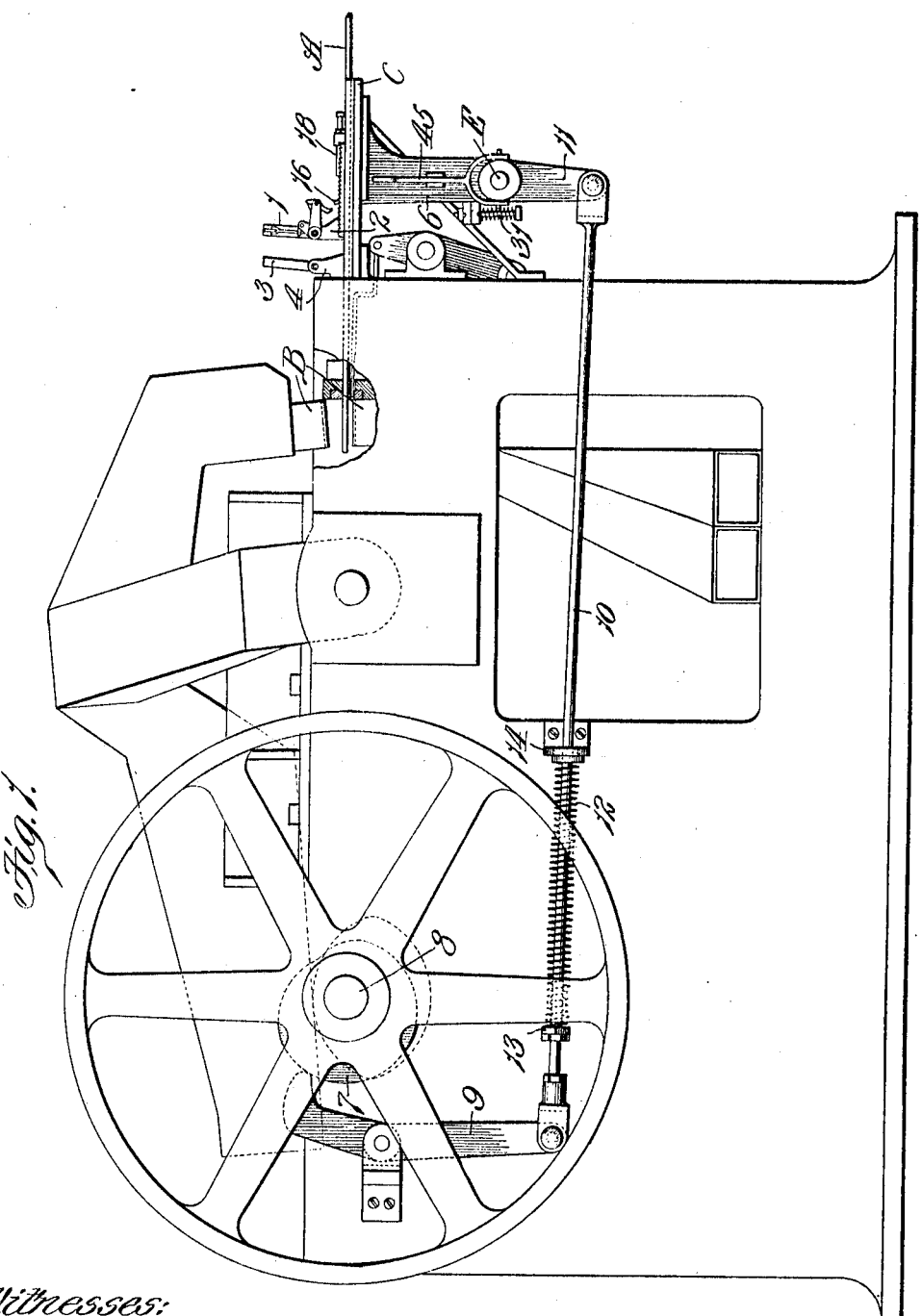

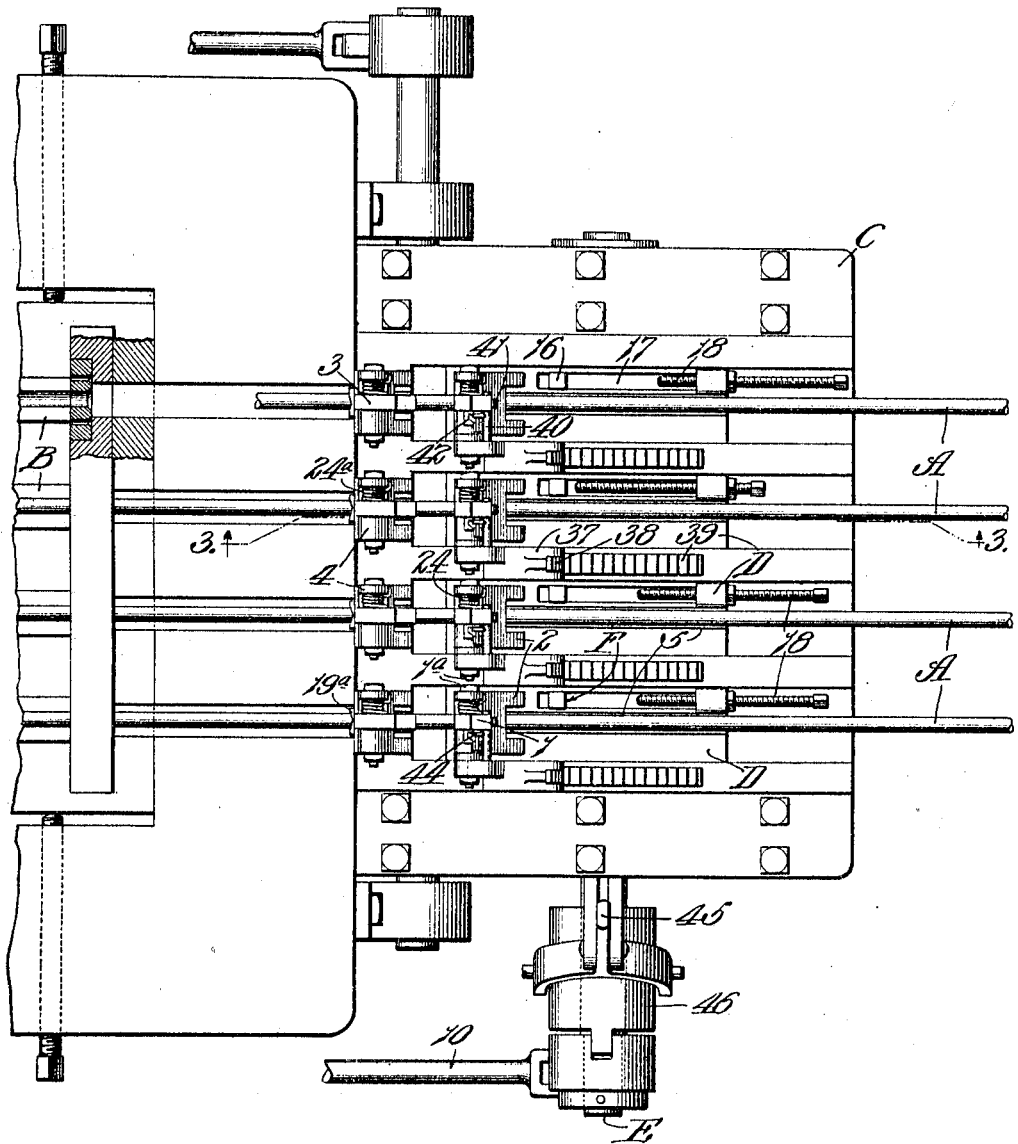

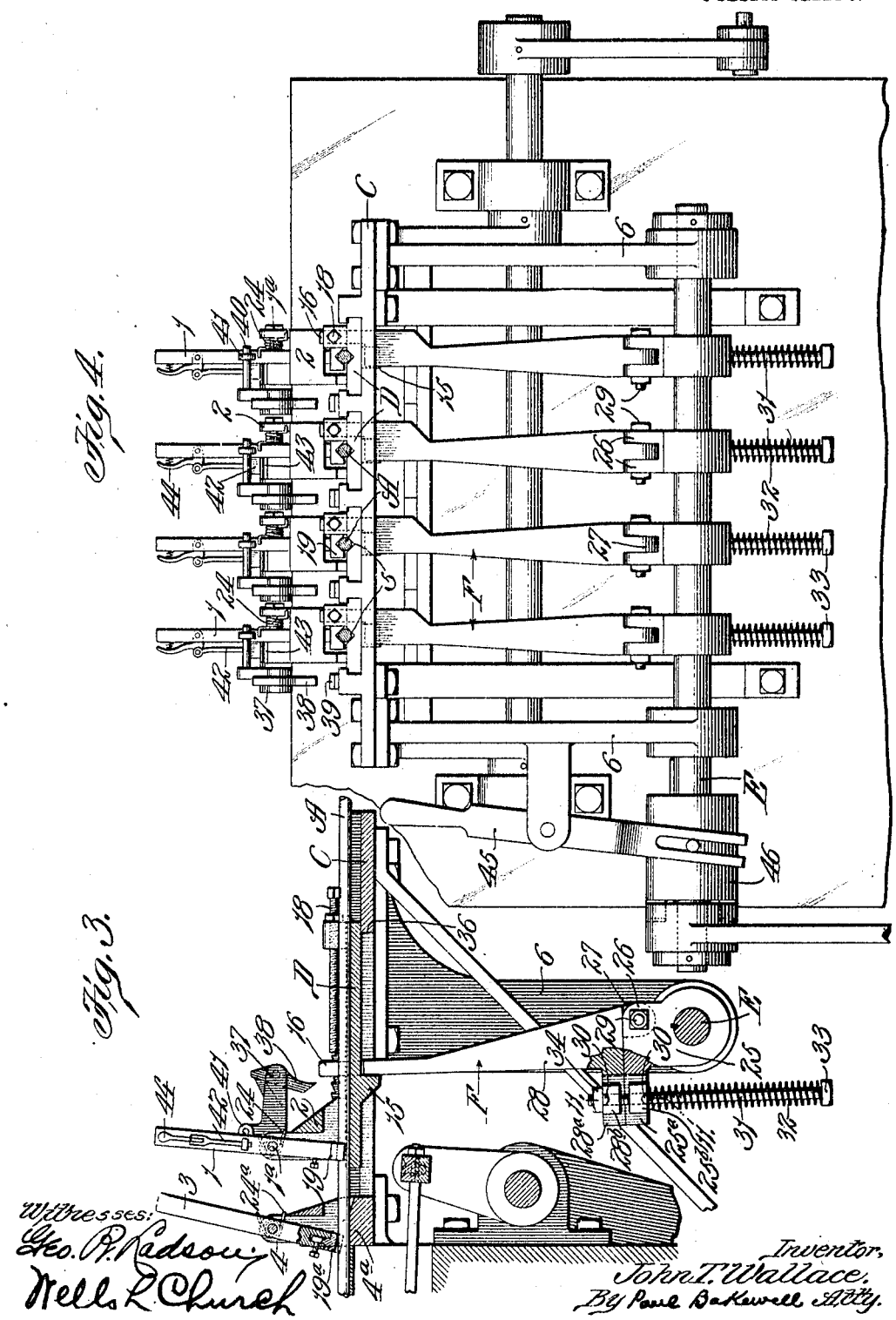

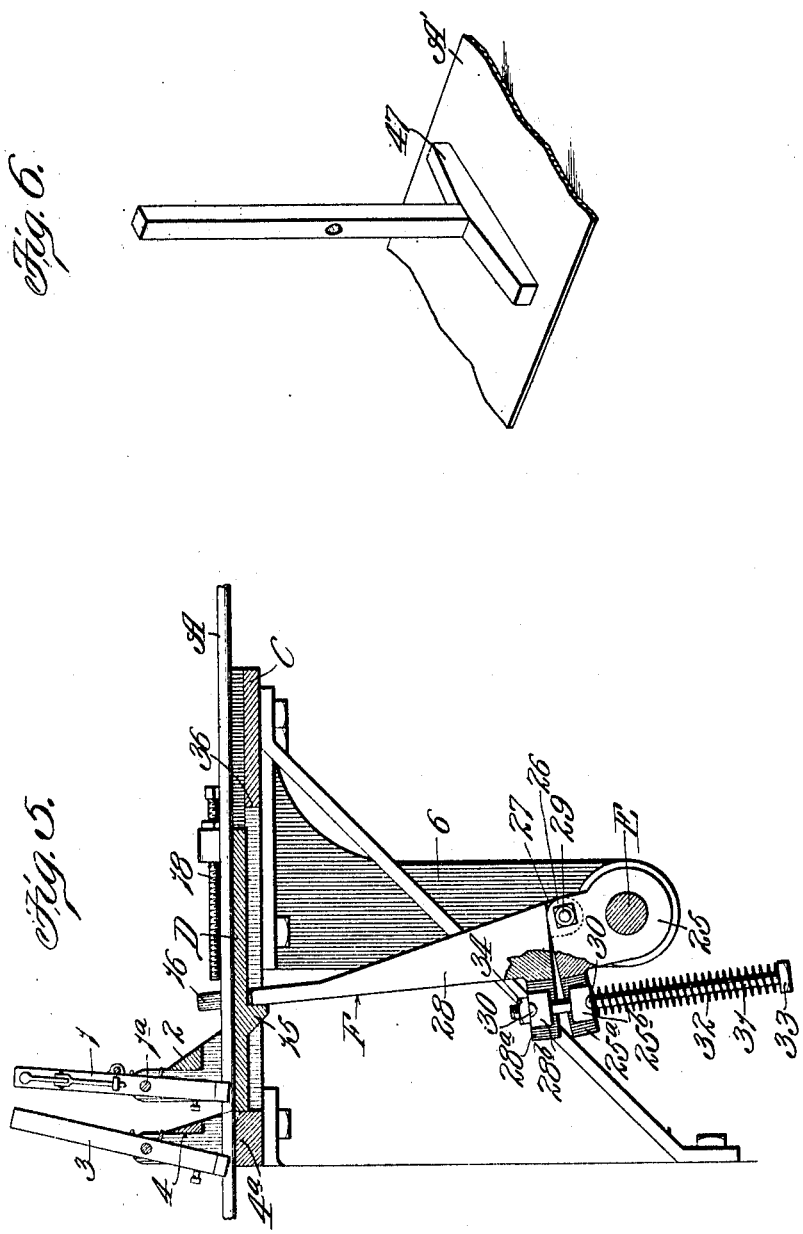

1,027,018.

Patented May 21, 1912.
5 SHEETS—SHEET 5.

Witnesses:
Geo. R. Radson
Wells L. Church

Inventor,
John T. Wallace.
By Paul Bakewell Atty.

UNITED STATES PATENT OFFICE.

JOHN T. WALLACE, OF ST. LOUIS, MISSOURI.

FEEDING MECHANISM.

1,027,018.  Specification of Letters Patent.  Patented May 21, 1912.

Application filed August 5, 1911. Serial No. 642,542.

*To all whom it may concern:*

Be it known that I, JOHN T. WALLACE, a citizen of the United States, residing at St. Louis, Missouri, have invented a certain new and useful Improvement in Feeding Mechanisms, of which the following is a full, clear, and exact description, such as will enable others skilled in the art to which it appertains to make and use the same.

This invention relates to feeding mechanisms of the type which comprise means for intermittently feeding a long strip to a device or devices which act on the strip.

One object of my invention is to provide a feeding mechanism of simple and novel construction which will accurately feed a strip intermittently or with a step-by-step movement.

Another object is to provide a feeding mechanism which is so constructed that any lost motion between the coöperating parts of same is automatically taken up, thus insuring an accurate and uniform feed at each cycle of operations.

Another object is to provide a feeding mechanism of the character referred to that can be adjusted easily so as to vary the degree of movement imparted to the strip with which the mechanism coöperates. And still another object is to provide a feeding mechanism that will feed a strip positively and which is so constructed that the parts of same will not become broken in case movement of the strip or of any of the parts of the mechanism is suddenly arrested.

Other objects and desirable features of my invention will be hereinafter pointed out.

I have herein illustrated my invention as being used for feeding a plurality of rods or strips of metal simultaneously to the dies of a rivet and bolt making machine, but I do not wish it to be understood that the invention is limited to this specific use or to use with rods for the invention can be used successfully for feeding any kind of a strip whether in the form of a rod or a sheet.

Figure 7:
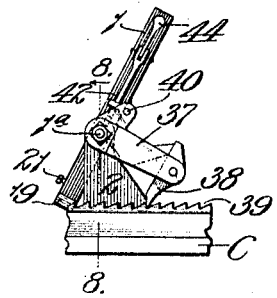
Figure 8:
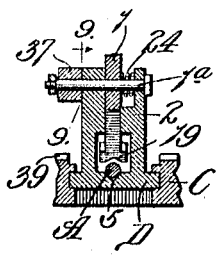
Figure 9:
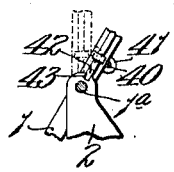
Figure 10:
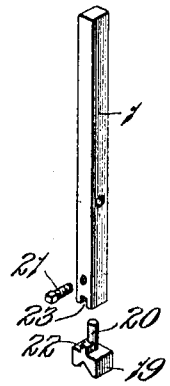
Figure 11:
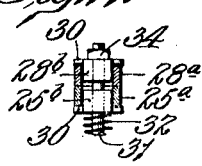
Figure 12:
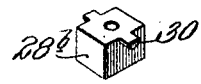

Figure 1 of the drawings is a side elevational view of a rivet and bolt making machine provided with a feeding mechanism constructed in accordance with my invention; Fig. 2 is an enlarged top plan view of the feeding mechanism; Fig. 3 is a vertical longitudinal sectional view taken on approximately the line 3—3 of Fig. 2; Fig. 4 is an end elevational view of the feeding mechanism; Fig. 5 is a view similar to Fig. 3 but with the parts in a different position; Fig. 6 is a perspective view of one form of gripping device that may be used when the mechanism is used for feeding a sheet or flat strip of material; Fig. 7 is a side elevational view of the gripping device on the reciprocating carriage; Fig. 8 is a cross sectional view taken on the line 8—8 of Fig. 7; Fig. 9 is a vertical sectional view taken on the line 9—9 of Fig. 8; Fig. 10 is a perspective view of the gripping device used on the mechanism shown in Figs. 1 to 3; Fig. 11 is a detail view taken on the line 11—11 of Fig. 3; and Fig. 12 is a perspective view of one of the blocks that forms part of the yielding connection between the two parts of the rock arm which moves each reciprocating carriage.

Referring to the drawings which illustrate a gang feeding mechanism constructed in accordance with my invention, A designates a plurality of rods or bars of iron which are fed simultaneously to the dies B of a rivet and bolt making machine with a step-by-step movement. The bars A are arranged parallel to each other in the same horizontal plane, and a separate feeding carriage is provided for each rod, thereby enabling the different rods to be moved different distances. A common actuating shaft is provided, however, for all of the feeding carriages so that said carriages will move in unison.

A horizontally disposed table C, which is arranged in front of the dies B, is provided with parallel guideways in which carriages D are reciprocatingly mounted, as shown in Figs. 2 and 4. Said carriages are duplicates of one another, and each carriage is provided with a pivotally mounted gripping device 1 which is adapted to engage the rod A which the carriage coöperates with, and move said rod toward the dies B on the forward stroke of the carriage or when the carriage moves toward the dies B, said gripping device 1 being pivotally mounted on a bracket 2 on the carriage, as shown in Figs. 7 and 8. When the carriage moves in the opposite direction back to starting position the rod A is gripped and held at rest by means of a holding device 3 which is pivotally mounted in a bracket 4 on the stationary table C, said holding device 3 and said gripping device 1 being arranged in longitudinal alinement with a groove 5 in the carriage which receives the rod A.

The forward stroke of all of the carriages is the same but the return stroke of said carriages may be varied so as to enable one rod to be fed forwardly a different distance than the other rods. The means which moves the carriages consists of a rock shaft E journaled in depending brackets 6 on the under side of the table C and provided with arms F that engage the carriages D and thus reciprocate them forwardly and backwardly when the shaft E rocks in opposite directions, movement being imparted to said shaft E by means of a cam 7 on the main shaft 8 of the rivet and bolt making machine, a lever 9 which coöperates with said cam, a link 10 pivotally connected to the lower end of the lever 9 and to a depending arm 11 on the rock shaft E and a coiled compression spring 12 arranged between a collar 13 on the link 10 and a stationary stop 14, as shown in Fig. 1.

The arms F are rocked forwardly, or in a direction to impart a forward stroke to the carriages toward the dies B, by means of the cam 7, and are rocked rearwardly so as to move the carriages back to starting position by means of the compression spring 12. Each carriage D is provided on its under side with a depending lug 15 which the upper end of the arm F engages when said arm is rocked forwardly, and each arm F is provided with a reduced extension 16 that projects upwardly through a longitudinal slot 17 in the carriage and engages an adjustable stop 18 on the carriage when the arm is rocked rearwardly or in the opposite direction, the lug 15 on the under side of the carriage being preferably arranged in longitudinal alinement with the groove 5 in the carriage which receives the rod A so as to cause the power to be applied to the carriage on the forward stroke of same at a point in alinement with the strip or rod which the carriage feeds. The forward stroke of the carriage is always the same but the rearward stroke of the carriage may be varied by adjusting the stop 18 with relation to the depending lug 15 on the carriage. If the stop 18 is adjusted in the manner shown in Fig. 3 the rearward stroke of the carriage will be relatively great owing to the fact that the extension 16 on the arm F engages the stop 18 practically as soon as said arm F starts to rock rearwardly. Consequently, on the succeeding forward stroke of the carriage the rod A with which the carriage coöperates will be fed forwardly a distance nearly as great as the length of the stroke of the carriage. If the stop 18 is adjusted so that its end is located farther away from the depending lug 15 on the under side of the carriage the rearward stroke of the carriage will not be as great because the arm F will rock rearwardly some distance before the extension 16 thereon engages the stop 18 and moves the carriage rearwardly. Consequently, on the succeeding forward stroke of the carriage the rod will not be fed so great a distance because the carriage was not moved rearwardly so great a distance on its previous rearward stroke.

The gripping device 1 is provided with a jaw 19 for engaging the rod A, said jaw being preferably so constructed that it can be adjusted vertically relatively to the carriage. In the embodiment of my invention herein shown, the jaw 19 has a shank 20 which projects upwardly into a socket in the gripping device 1, and said device is provided with a set screw 21 that engages the shank 20 and thus clamps the jaw in adjusted position, the jaw being prevented from turning relatively to the device 1 by means of a lug 22 on the jaw which projects upwardly into a notch 23 in the device 1, as shown in Fig. 10. A coiled spring 24 which surrounds the pivot 1$^a$ on which the gripping device 1 is fulcrumed, and bears against said gripping device and against the bracket 2, as shown in Figs. 7 and 8, forces the lower end of the gripping device toward the carriage and thus causes the jaw 19 to grip the rod A tightly when the carriage moves forwardly. When the carriage moves in the opposite direction back to starting position, the jaw 19 slides over the rod A because the movement of the carriage in this direction tends to force the lower end of the gripping device 1 upwardly, it being understood that the rod A is held at rest by the holding device 3 on the return or rearward stroke of the carriage. The holding device 3 is provided at its lower end with a vertically adjustable jaw 19$^a$ and a coiled spring 24$^a$ exerts pressure on said holding device so as to force the jaw on the lower end of same toward the rod A and thus securely clamp the rod in case it tends to move rearwardly, said holding device being so constructed that a slight rearward movement of the rod on the return stroke of the carriage causes the jaw 19$^a$ on said holding device to clamp the rod firmly against the grooved base 4$^a$ of the bracket 4, as shown in Fig. 3, thereby causing the rod to remain at rest during the remainder of the rearward stroke of the carriage.

Each of the carriage-operating arms F is composed of two pivoted sections or parts which are normally held together by means of a spring that is strong enough to prevent said sections from moving relatively to each other when the arm is feeding the carriage forwardly. As shown in Figs. 3, 4 and 5, the lower part or section 25 of the arm F is securely connected to the rock shaft E and is provided at its rear side with a pair of ears 26 which embrace a lug 27 on the lower end of the upper section or part 28 of the arm, a bolt or other suitable fastening device 29 passing through the lug 27 and ears 26 so as to pivotally connect the two sections of the arm together. Said sections have coöperating portions arranged in front of the ears 26 and lug 27 which normally bear upon each other and prevent said sections from moving relatively to each other in one direction, these coöperating portions being so arranged that the upper section 28 can move rearwardly relatively to the lower section 25 but not forwardly relatively to said lower section. Consequently, on the rearward stroke of the arm F the arm is rigid and cannot yield but on the forward stroke of said arm one section of same can move relatively to the other section. The sections 25 and 28 are provided at their front edges with forwardly projecting jaws 25$^a$ and 28$^a$ in which blocks 25$^b$ and 28$^b$ are rockably mounted, said blocks having half-round trunnions 30 which fit in curved seats or recesses in the jaws. A rod 31 passes through openings in said blocks, and a coiled compression spring 32 is arranged on said rod between a head 33 on the lower end of same and the block 25$^b$ carried by the jaws on the lower section 25, a nut 34 being mounted on the upper end of said rod above the block 28$^b$ carried by the jaws on the upper section 28 of the arm F. The spring 30 forces the block 25$^b$ upwardly against the jaws 25$^a$ in which said block is rockably mounted, and also draws the block 28$^b$ downwardly against the jaws 28$^a$ which carry said block and thus holds the two sections 25 and 28 of the arm F normally in alinement with each other, as shown in Fig. 3.

On the forward stroke of the arm F the front end of the carriage D, with which said arm coöperates, strikes against the base 4$^a$ of the bracket 4 with which that particular carriage coöperates and thus causes said carriage to come to rest before the rock shaft E has completed its movement, thereby causing the upper section 28 of the arm F to come to rest before the lower section 26 of the arm has completed its forward stroke, as shown in Fig. 5. By arranging the rod 31 in blocks or bearings which are rockably mounted in the two sections of the arm F I prevent the rod from binding when said sections move relatively to each other in the manner just described because said bearing blocks rock in their seats and thus permit the rod 31 to remain in practically a vertical position.

One advantage in constructing the arms F in the manner above-described is that lost motion or wear in any of the parts of the carriage-operating mechanism or on the front end of the carriage and the stationary member 4$^a$ which limits the forward movement of the carriage is automatically taken up, owing to the fact that the spring 32 exerts pressure on the upper section 28 of the arm F after the carriage has come to rest and thus yieldingly forces the front end of the carriage against said stationary member 4$^a$. Another advantage of such a construction is that a sudden stopping of the carriage or carriages will not cause the carriage-feeding mechanism to become broken owing to the fact that the parts of the arms which engage the carriages can remain at rest while the other parts of the arms which are secured to the operating shaft can continue in motion. And still another advantage is that one or more carriages may be locked and prevented from reciprocating back and forth while the rock shaft E of the feeding mechanism continues in operation, as hereinafter more clearly described.

Shoulders 36 at the rear ends of the slots in the table C, through which the upper ends of the arms F project, act as stops to limit the rearward movement of said arms, said shoulders being so located that the arms F will strike against same on their rearward strokes at a period in the cycle of operations of the machine when the upper end of the lever 9 is not bearing upon the cam 7 which imparts forward movement to the arms F through the instrumentality of the lever 9, link 10 and arm 11 on the rock shaft E. In other words, the stops 36 are so positioned and the cam 7 is so formed that the carriage-operating arms F will come to rest on their rearward strokes at a time when said cam does not bear upon the lever which it actuates, thereby causing the spring 12 to force the arms F against the stops 36 and thus take up any wear or lost motion between said stops and said arms or in any of the coöperating parts of the carriage-operating mechanism.

From the foregoing it will be seen that I have produced a feeding mechanism of simple construction which will feed one or more strips a certain distance at each cycle of operations of the machine, and that any wear or lost motion is automatically taken up by reason of the fact that yielding pressure is exerted on the carriages when they reach the end of their forward stroke and when they reach the end of their rearward stroke. The simplicity of construction of the mechanism reduces the liability of its getting out of order, and as the mechanism can be so adjusted that the carriages move forwardly different distances the mechanism can be used for simultaneously feeding a plurality of strips different distances with a step-by-step movement.

In order that the feeding of one strip may be discontinued without affecting the feeding of the other strips, I have provided means which enables each carriage to be locked independently so that one carriage can remain at rest while the others continue in operation. The means herein shown for accomplishing this consists of rock arms 37 pivotally mounted on the brackets 2 on the carriages and provided with pawls 38 that coöperate with stationary racks 39 on the table C. One of these rock arms 37 is provided for each of the gripping devices 1 to which it is connected by means of a pin 40 branching laterally from a lug on the upper end of same and passing through an eye 41 on the rear side of the gripping device, as shown more clearly in Figs. 4 and 9, thereby causing said gripping device and rock arm to move together. Each rock arm 37 is so arranged with relation to the gripping device with which it coöperates that the pawl 38 will be normally held in an operative position or out of engagement with its coöperating rack 39, as shown in Fig. 3, thereby preventing it from interfering with the forward and return stroke of the carriage. In case it is desired to throw the carriage out of operation the operator moves the upper end of the gripping device 1 rearwardly, as shown in Fig. 7, so that a spring-actuated dog 42 mounted on said device can spring into a notch 43 on the upper edge of the bracket 2 and thus lock the gripping device 1 in an inoperative position and the pawl 38 in an operative position, as shown in Fig. 7. If this adjustment is made when the carriage is at the end of its forward stroke the carriage will move rearwardly because the teeth of the rack 39 are so formed that the pawl will travel over same when the carriage moves in this direction but said pawl will lock the carriage when it reaches the end of its rearward stroke and thus prevent it from moving forwardly until the spring-actuated plunger 42 is released from the coöperating notch 43 in the bracket, the gripping device 1 being provided with a finger lever 44 for raising said plunger.

Locking the carriage in the manner above-described, of course, holds the upper section 28 of the carriage-actuating arm F at rest but the lower section 25 of said arm can continue to move with the rock shaft E. Consequently, with such a feeding mechanism the operator can throw one or more of the feeding carriages out of operation at will without disturbing the operation of the other feeding carriages. In case the operator desires to throw the entire feeding mechanism out of operation without stopping the rivet and bolt making machine with which the feeding mechanism is used, he moves a lever 45 which controls a clutch 46 that connects the rock arm 11 to the rock shaft E.

As previously stated, my invention is not limited to a mechanism for feeding rods or bars for it could be used equally well for feeding flat sheets or strips A' by simply changing the proportion of the carriage and providing the gripping and holding devices with relatively wide jaws 47, as shown in Fig. 6.

Having thus described my invention, what I claim as new and desire to secure by Letters Patent is:

1. A feeding mechanism comprising a reciprocating carriage provided with means for engaging a strip and feeding it forwardly when the carriage moves in one direction, means for holding the strip when the carriage moves in the opposite direction, an operating member for said carriage, and means for causing said operating member to exert yielding pressure on said carriage when it reaches the end of its stroke.

2. A feeding mechanism comprising a reciprocating carriage provided with means for engaging a strip and feeding it forwardly when the carriage moves in one direction, means for holding the strip when the carriage moves in the opposite direction, an operating member for said carriage, means for positively moving said operating member in one direction, yielding means for moving said member in the opposite direction, and independent means for causing said operating member to exert yielding pressure on said carriage when it reaches the end of its forward stroke.

3. A feeding mechanism comprising a reciprocating carriage provided with means for engaging a strip and feeding it forwardly when the carriage moves in one direction, means for holding the strip when the carriage moves in the opposite direction, an operating member for said carriage which comprises a plurality of parts, means for positively moving one of said parts, and a yielding connection between said parts which causes them to move as one until the carriage reaches the end of its stroke in one direction.

4. A feeding mechanism comprising a reciprocating carriage, a device on said carriage arranged to grip a strip and feed it when the carriage moves forwardly and automatically release said strip on the return stroke of the carriage, an automatically operating device which grips the strip on the return stroke of the carriage and releases it on the forward stroke of the carriage, a rock arm for actuating said carriage comprising a plurality of parts or sections that are pivotally connected together, an operating shaft to which one of said parts is connected, and a yielding connection between said parts which causes them to move as one until the carriage reaches the end of its stroke in one direction.

5. A feeding mechanism comprising a reciprocating carriage, a device on said carriage arranged to grip a strip and feed it when the carriage moves forwardly and automatically release said strip on the return stroke of the carriage, an automatically operating device which grips the strip on the return stroke of the carriage and releases it on the forward stroke of the carriage, a rock arm for actuating said carriage comprising a plurality of parts or sections that are pivotally connected together, an operating shaft to which one of said parts is connected, coöperating portions on said sections which bear against each other and thus prevent said sections from moving relatively to each other, blocks rockably mounted in said portions, a rod passing through said blocks, and yielding means coöperating with said rod to hold said sections together.

6. A feeding mechanism comprising a reciprocating carriage, a device on said carriage arranged to grip a strip and feed it when the carriage moves forwardly and automatically release said strip on the return stroke of the carriage, an automatically operating device which grips the strip on the return stroke of the carriage and releases it on the forward stroke of the carriage, a rock arm for actuating said carriage comprising a plurality of parts or sections that are pivotally connected together, an operating shaft to which one of said parts is connected, coöperating jaws on said sections, a block rockably mounted on the upper side of one of said jaws, a block rockably mounted on the under side of the other jaw, a rod passing through said blocks and provided at its upper end with a stop which engages said upper jaw, and a spring arranged on said rod between said lower block and a stop on the lower end of the rod.

7. A feeding mechanism comprising a reciprocating carriage provided with a device that is arranged to engage a rod and feed it on the forward stroke of the carriage and automatically release the rod on the return stroke of the carriage, means for holding said rod at rest on the return stroke of the carriage, an operating member having an extension which passes through a slot in said carriage, a shoulder on said carriage which said operating member engages when it moves in one direction, and an adjustable device on the carriage which said operating member engages when it moves in the opposite direction.

8. A feeding mechanism comprising a reciprocating carriage provided with means for engaging a rod and feeding it on the forward stroke of the carriage, means for holding said rod at rest on the return stroke of the carriage, an operating member for said carriage, a stationary abutment coöperating with said carriage to limit the forward movement of same, a stationary abutment coöperating with said operating member for limiting the rearward movement of same, and yielding means for causing said carriage to be forced tightly against its coöperating abutment and for causing said operating member to be forced against its coöperating abutment.

9. A feeding mechanism comprising a reciprocating carriage provided with a device that is arranged to grip a strip on the forward stroke of the carriage and automatically release said strip on the return stroke of the carriage, a holding device mounted on a stationary member and arranged to grip said strip on the return stroke of the carriage and automatically release it on the forward stroke of the carriage, a rock shaft, an arm on said shaft composed of a plurality of sections pivotally connected together, a yielding connection between said sections arranged to cause said arm to exert pressure on the carriage after it reaches the end of its forward stroke, and yielding means coöperating with said rock shaft to move said arm rearwardly.

10. A feeding mechanism comprising a reciprocating carriage provided with a gripping device that is adapted to engage a strip and feed it on the forward stroke of the carriage, means for holding said strip at rest on the return stroke of the carriage, a rock shaft provided with an arm that actuates said carriage, an operating mechanism for said rock shaft comprising a cam and a lever which are so arranged that said shaft will be rocked forwardly, yielding means for rocking said shaft rearwardly, and means that arrests the rearward movement of said arm at a point in the cycle of operations of the mechanism when said lever is out of engagement with said cam.

11. A feeding mechanism comprising a reciprocating carriage provided with means for feeding a strip forwardly, means for holding said strip on the return stroke of the carriage, a primary actuating mechanism for said carriage, and means for permitting the carriage to remain at rest while said primary actuating mechanism continues in operation.

12. A feeding mechanism comprising a reciprocating carriage provided with means for feeding a strip forwardly, means for holding said strip on the return stroke of the carriage, a rock shaft provided with an arm that engages said carriage and reciprocates it backwardly and forwardly, said arm consisting of a plurality of yieldingly connected sections, and means which enables said carriage to be locked when it reaches the end of its rearward stroke without discontinuing the operation of said rock shaft.

13. A feeding mechanism comprising a reciprocating carriage, a table on which said carriage is mounted, a gripping device on said carriage arranged to engage a strip and feed it forwardly on the forward stroke of the carriage and release said strip on the return stroke of the carriage, a holding device on said table arranged to engage said strip on the return stroke of the carriage and automatically release it on the forward stroke of the carriage, a rock arm projecting upwardly through slots in the table and in the carriage, a shoulder on said carriage which said rock arm engages when it moves in one direction, an adjustable device on said carriage which said rock arm engages when it moves in the opposite direction, said rock arm consisting of two sections pivotally connected together, and yielding means which normally hold said sections together.

14. A feeding mechanism comprising a plurality of reciprocating carriages provided with means for feeding a plurality of parallel arranged strips on the forward strokes of said carriages, means for holding said strips on the return strokes of the carriages, means for reciprocating said carriages simultaneously, and means for enabling the strokes of said carriages in one direction to be varied, thereby permitting the mechanism to be used for feeding strips different distances at the same time.

15. A feeding mechanism comprising a plurality of reciprocating carriages provided with means for feeding a plurality of parallel arranged strips on the forward strokes of said carriages, means for holding said strips on the return strokes of the carriages, means for reciprocating said carriages simultaneously, means for enabling the strokes of said carriages in one direction to be varied, thereby permitting the mechanism to be used for feeding strips different distances at the same time, and means for enabling any of said carriages to be locked in an inoperative position without affecting the operation of the other carriages.

In testimony whereof I hereunto affix my signature in the presence of two witnesses, this first day of August 1911.

JOHN T. WALLACE.

Witnesses:
  WELLS L. CHURCH,
  GEORGE BAKEWELL.